United States Patent [19]

Dias et al.

[11] Patent Number: 5,191,652

[45] Date of Patent: Mar. 2, 1993

[54] METHOD AND APPARATUS FOR EXPLOITING COMMUNICATIONS BANDWIDTH AS FOR PROVIDING SHARED MEMORY

[75] Inventors: Daniel M. Dias, Mahopac, N.Y.; Balakrishna R. Iyer, Fremont, Calif.

[73] Assignee: International Business Machines Corporation, Armonk, N.Y.

[21] Appl. No.: 434,969

[22] Filed: Nov. 13, 1989

[51] Int. Cl.$^5$ .............................................. G06F 13/38
[52] U.S. Cl. .................................. 395/200; 370/94.1; 364/DIG. 1; 364/229.3; 364/228.1
[58] Field of Search ................... 364/DIG. 1 MS File; 370/60, 85.15; 395/200

[56] References Cited

U.S. PATENT DOCUMENTS

| | | | |
|---|---|---|---|
| 4,399,504 | 8/1983 | Obermarck et al. | 364/DIG. 1 |
| 4,402,046 | 8/1983 | Cox et al. | 364/DIG. 1 |
| 4,412,285 | 10/1983 | Neches et al. | 364/DIG. 1 |
| 4,441,152 | 4/1984 | Matsuura et al. | 364/DIG. 1 |
| 4,480,304 | 10/1984 | Carr et al. | 364/DIG. 1 |
| 4,587,609 | 5/1986 | Boudreau et al. | 364/DIG. 1 |
| 4,656,666 | 4/1987 | Piekenbrock . | |
| 4,692,918 | 9/1987 | Elliott et al. . | |
| 4,716,528 | 12/1987 | Crus et al. . | |
| 4,768,190 | 8/1988 | Giancarlo | 370/86 |
| 4,884,192 | 11/1989 | Terada et al. | 364/DIG. 1 |

FOREIGN PATENT DOCUMENTS 601278 11/1988 Australia .

OTHER PUBLICATIONS

Widmer et al., "A DC-Balanced, Partitioned-Block, 8B/10B Transmission", Sep. 1983, IBM J. Res. Develop, vol. 27, pp. 440–451.

Sekino et al., "The DCS-A New Approach to Multisystem Data-Sharing", 1984, National Computer Conference pp. 59–68.

Iyer et al., "Analysis of Trade-offs in Distributed Locking for Transaction Processing Systems", 1988, Computer Performance and Reliability pp. 417–429.

Dias et al., "Token Ring-Based Distributed Lock Manager" Dec. 1987, IBM Technical Disclosure Bulletin, vol. 30, pp. 263–266.

Kronenberg et al. "VAX clusters: A Closely-Coupled Distributed System" May 1986, A CM Transactions on Computer Systems, vol. 4, pp. 130–146.

*Primary Examiner*—Thomas M. Heckler
*Attorney, Agent, or Firm*—Ratner & Prestia

[57] ABSTRACT

A multiprocessor system linked by a fiber optic ring network uses some of the bandwith of the ring network as a shared memory resource. Data slots are defined on the network which can carry message packets from one processor to another or network memory packets which circulate indefinitely on the network. One use of these network memory packets is as a lock management system for controlling concurrent access to a shared database by the multiple processors. The network memory packets are treated as lock entities. A processor indicates that it wants to procure a lock entity by circulating a packet, having a first network memory type, around the network. If no conflicting packets are detected when the circula ted packet returns, the type of the slot is changed to a second network memory type indicating a procured lock entity.

8 Claims, 7 Drawing Sheets

SLOT FORMAT

METHOD AND APPARATUS FOR EXPLOITING COMMUNICATIONS BANDWIDTH AS FOR PROVIDING SHARED MEMORY

FIELD OF THE INVENTION

The present invention relates generally to shared memory systems for use in multi-processor computer networks and particularly to a method of utilizing part of the bandwidth and propagation delay of a communications network as a shared memory resource.

BACKGROUND OF THE INVENTION

It is well known that multiple processors may be coupled together by a computer network to form a multi-processor computer system which operates more effectively than the individual uncoupled processors. In a system of this type, data and program code may be transferred over the network from one processor to another to make effective use of a shared resource, such as a database, or to distribute and balance a workload among all of the processors.

Systems of this type, for the most part, are currently limited by the bandwidth of the interconnecting network. That is to say, the desired message traffic generally exceeds the capacity of the communications network This limitation manifests itself as processing delays for the tasks running on the multiprocessor system. For example, in normal operating conditions, one processor may be waiting for a message from another processor while the other processor is waiting for the network to be able to send the message. Conditions of this type may significantly reduce the apparent performance of a computer system.

A computer system which includes multiple transaction processors that may perform operations on a single shared database is especially susceptible to delays of this kind To prevent data corruption resulting from multiple simultaneous access to a single data item or set of data items, systems of this type generally include a concurrency control mechanism which may make frequent use of the interconnecting network.

In a typical concurrency mechanism, the separate records in the common database are each assigned a respectively different lock entity Access to the data in a record is controlled through its corresponding lock entity. In order to read or write data in a particular record, a transaction executing on one of the transaction processors first "procures" the lock and then changes its state to indicate its type of access. When the transaction is complete, the lock entity is "released". While the lock is procured by one task, its changed state prevents other processors from attempting to procure it and thus from attempting to access the protected record.

The "procuring" and "releasing" of lock entities occurs according to a fixed protocol implemented by lock management software which is accessible to all of the coupled transaction processors. While this lock-management software generally operates efficiently, it may, in some instances produce excessive processing delays of the type described above.

Delays of this type occur when one processor is waiting to procure a lock that another processor is ready to release but network traffic unduly delays either the request for the lock entity from the procuring processor or the notification from the releasing processor that the lock is available. These delays may hold up other requests for the lock entity, creating more processing delays.

Much of the waiting delay in interprocessor communication of this type is eliminated when optical fiber networks of relatively high bandwidth are used to connect the transaction processors. Communications networks of this type are expected to have data transmission speeds on the order of 1 Gigabits per second (Gbps). Since the network propagation delay does not change significantly, this additional bandwidth increases the amount of data that may be in transit on the network at any given time. Thus, a network of this type may substantially eliminate any waiting period for access to the network.

However, even with an interconnection network having a high transmission speed, there may be delays caused by the interprocessor communications protocol. Delays of this type may occur, for example, when only one processor may perform a function, such as lock management or transaction allocation, that is used by all of the processors on the network. Since only one processor is performing this function, requests from the other processors may be delayed while earlier requests are processed.

The most common solution to problems of this type is to divide the function among all of the processors. One way in which this has been done is to partition the data structure used by the function among the different processors, allowing each processor to execute the function on its portion of the data. In a lock management system, for example, the lock entities which are used to control access to the various records may be divided among the processors.

Another way to solve the bottleneck problem is to establish a memory area, containing the data structure, which is shared by all of the processors. In this instance, the function may be performed by any of the processors, which directly access the common memory area only when necessary. Of course, in a system of this type, some sort of concurrency control would be used to prevent data corruption in the shared memory area. This concurrency mechanism on top of the locking concurrency mechanism may exacerbate the processing delays.

U.S. Pat. No. 4,399,504 to Obermark et al. relates to a lock management protocol in which a data structure (lock table) that includes multiple lock entities is passed from one processor to another and copied into the local memory of each processor when it is received. During the time interval between receiving and transmitting the lock table, programs running on the processor may procure available lock entities and release any currently held lock entities.

U.S. Pat. No. 4,412,285 to Neches et al. relates to a tree-structured data communications network in which a semaphore facility is used to effect communication among the processors connected by the network. Concurrency control (locking) is local to each processor for data that is under exclusive control of the processor.

U.S. Pat. No. 4,480,304 to Carr et al. relates to a recovery scheme for a distributed locking system that preserves the integrity of a database controlled by the locking system across system failures.

U.S. Pat. No. 4,692,918 to Elliot et al. relates to a reliable message transmission scheme between multiple interconnected processors. The processors are connected by two local area networks. If one fails, the other is used as a backup. This patent also refers to the use of broadcast media for connecting processors.

U.S. Pat. No. 4,716,528 to Crus et al. relates to a hierarchical locking system. This system assumes that a transaction uses a block of records. At the lowest level, the transaction utilizes a separate lock for each record. However, if the number of records in a block of records accessed by a process exceeds a threshold, all of the individual record locks are replaced by one lock for the entire block. Thus, the process may access any record in the block by procuring the one lock.

U.S. Pat. No. 4,656,666 to Piekenbrock discloses a method of utilizing a loop of electromagnetic energy between the Earth and an object in space as a memory resource. In this patent, data is loaded into and retrieved from the loop of electromagnetic energy. However, the access time may be relatively long since it is the delay between the earth and satellite that provides the memory resource In addition, corruption of the data due to electromagnetic interference is addressed only in passing.

SUMMARY OF THE INVENTION

The present invention is embodied in a computer system having multiple processors connected in a ring network. As used herein, a ring network is any network in which each of the coupled processors generally receives messages provided by a first other one of the coupled processors and generally sends messages to a second other one of the coupled processors. This network may be either physically or logically configured as a ring.

The computer system includes a plurality of network adapters, one for each of the multiple processors. The network adapters may operate on a set of data slots or packets that continuously circulate around the ring network. The network adapters include circuitry which accesses the data in these packets directly to determine if the packet is used to transfer data between processors or as a network memory resource. In the latter case, the network adapters include further circuitry which reads and modifies the data in the slot directly, without providing the data to its associated processor.

DETAILED DESCRIPTION

Figure 1:
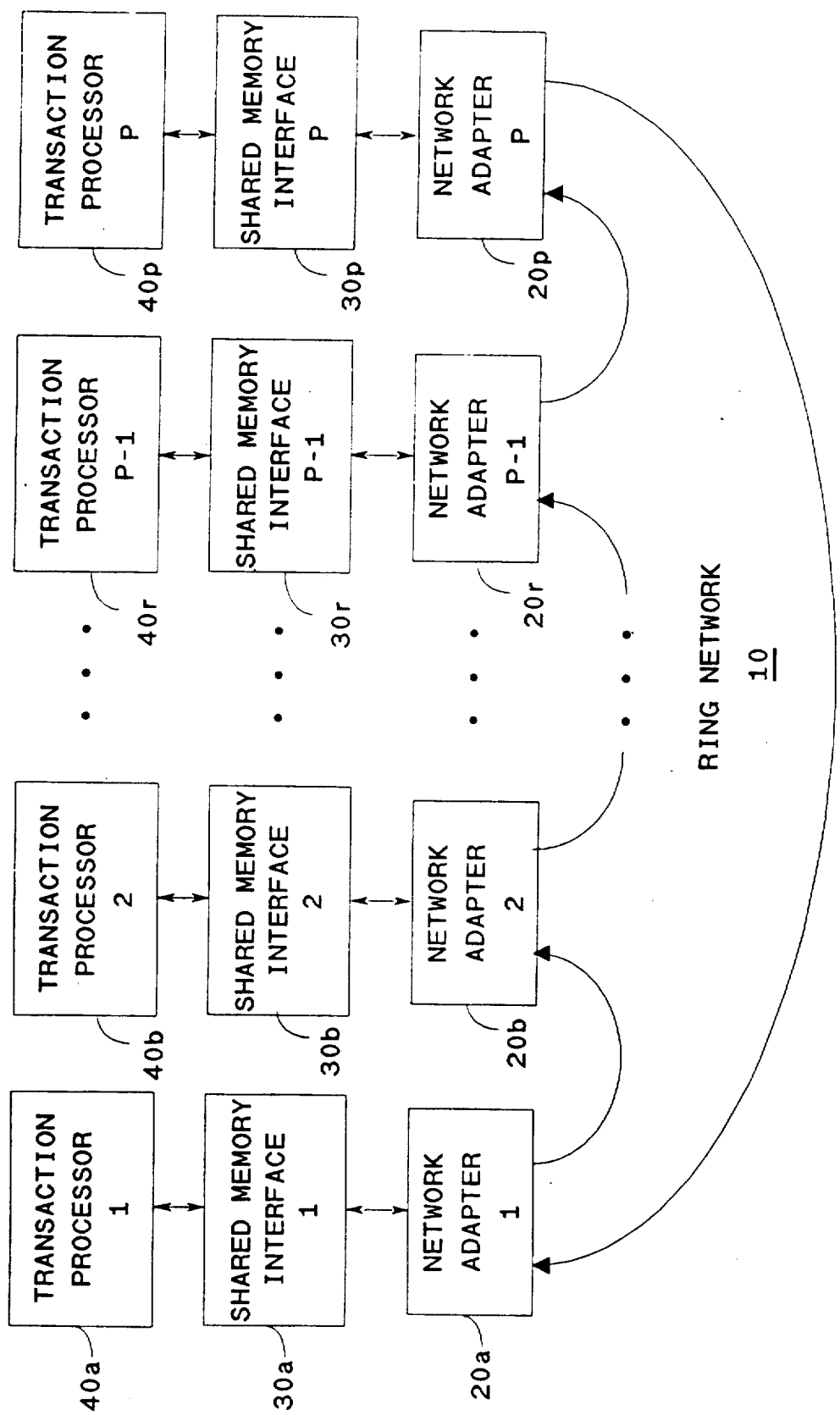
FIG. 1 is a block diagram of a computer system which includes an embodiment of the present invention.

FIG. 1 is a block diagram of a computer system which may include an embodiment of the present invention. This system includes P separate transaction processors 40a through 40p each being coupled to a respective shared memory interface 30a through 30p and to a respective network adapter 20a through 20p. The network adapters couple their associated transaction processors to a ring network 10. The ring network 10, which may, for example, be a conventional optical fiber network, couples the network adapters 20a through 20p in a ring arrangement, such that each processor, by default, sends packets to a first other processor and receives packets from a second other processor. In a computer system which includes an embodiment of this invention, a portion of the bandwidth of the computer network 10 and the propogation delay for sending data packets through the network are used as a memory resource which is shared by all of the processors.

In the normal operation of a system of this type, packets containing data to be transferred among the processors only exist during the time that the data is being transmitted. For example, in the computer system shown in FIG. 1, communication between two processors may occur as follows. A sending processor, for example, 40a, prepares a data packet for transmission to a receiving processor, for example, 40p. This data packet is passed through the shared memory interface 30a to the network adapter 20a. In the adapter 20a, an identifier for the receiving processor and packet starting and ending delimiters are added to the data packet; the packet is converted into modulated light signals; and these signals are sent over the network 10 to the network adapter 20b. Adapter 20b receives the packet and compares its processor identifier to the one in the packet and, since they do not match, sends the packet to the next network adapter in the chain.

This process continues with each network adapter 20 passing the packet to the next adapter 20 until the packet is received by the network adapter 20p. This adapter finds a match between its own processor identifier and the processor identifier in the data packet. Consequently, it removes the packet from the network and passes it, through the shared memory interface 30p to the transaction processor 40p.

In the exemplary embodiment of the invention, a relatively large number of slots which may hold data packets are generated on the network during system initialization. For example, one of the network adapters 20 may be programmed to generate empty slots at regularly spaced intervals as part of its initialization routine. In normal operation, these slots may be empty, they may carry data packets between processors, as set forth above, or they may carry one or more types of network memory packets. These network memory packets do not have a destination processor, they are meant to circulate indefinitely on the network.

In the described embodiment of the invention, the network memory packets are used to implement a locking system that is used to control access to a shared database. However, this locking system is intended as one example of how the shared memory resource may be used. It is contemplated that the network memory packets may also be used to hold a task queue for distributing and balancing the workload among the coupled processors.

Figure 2:
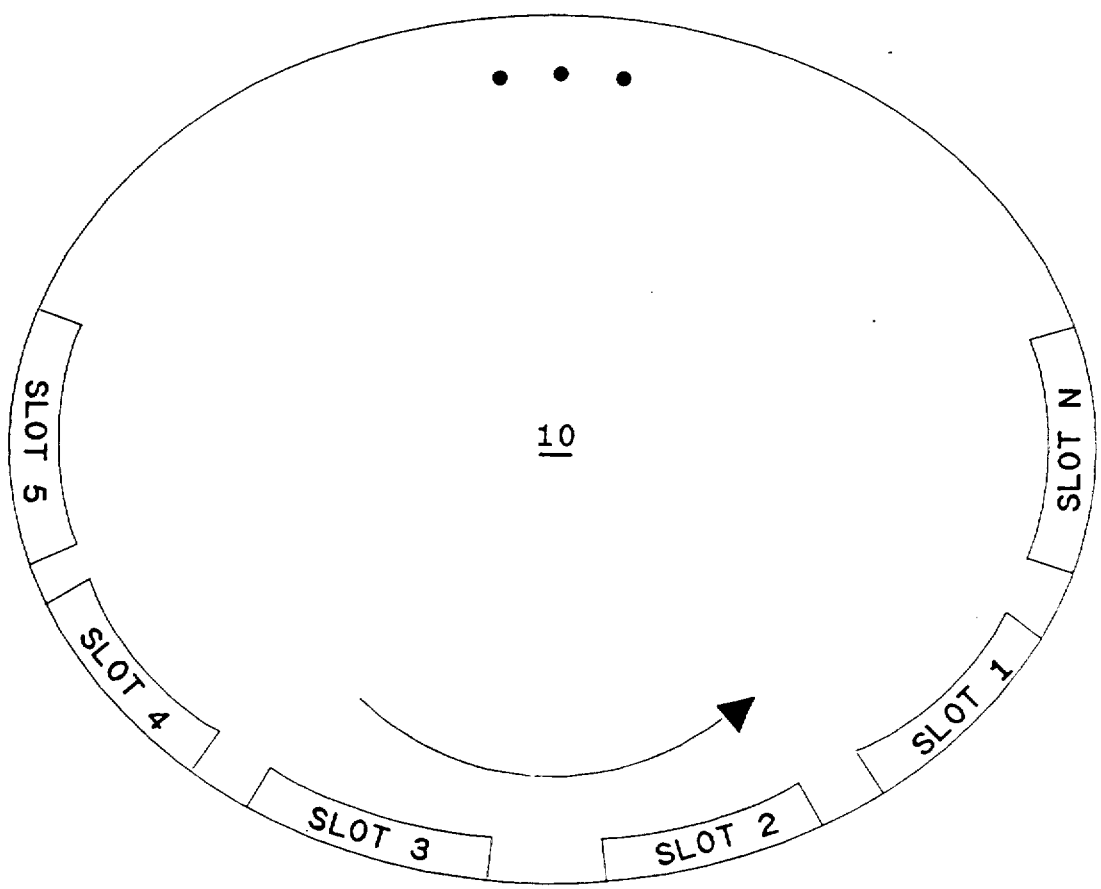
FIG. 2 is a drawing of the ring network shown in FIG. 1 which is useful for describing the operation of the present invention.

The ring network provides the medium for establishing the shared memory slots. In this embodiment of the invention, the ring network 10 consists of optical fibers which link the network adapters 20a through 20p in a ring configuration. Data circulating around this ring is organized as multiple slots as shown in FIG. 2. Although this exemplary embodiment uses fixed-length slots, it is contemplated that variable length packets may be used to convey the various types of packets around the network.

The basis for this shared-memory mechanism is the inherent propagation delay in the transmission of data from one network adapter (e.g. 20a) to the next adjacent adapter (e.g. 20b). This propagation delay is approximately five microseconds (μs) per kilometer (KM) of optical fiber. For this exemplary embodiment, it is assumed that the data transmission speed on the ring network is 1 Gbps. At this transmission speed, approximately 5,000 bits may reside in a 1 KM length of optical fiber.

The amount of data that may be resident on a ring network at any given time is further increased by the processing delay that a message encounters at one of the network adapters 20. In general, the number of bits which may be resident on the network is the product of the transmission speed and the sum of the network transmission and processing delays.

Figure 3:
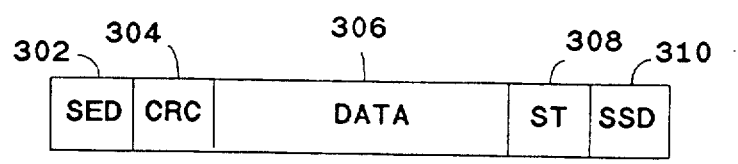
FIG. 3 is a data structure diagram of a data slot on the network.

The data transmitted by an optical fiber network may be in several parallel bit-streams which are frequency-division multiplexed or wave-division multiplexed on the light signals transmitted through the optical fibers. Each of these bit-streams may be treated as an set of independent slots. However, to simplify the explanation of the invention, only one bit-stream is shown in FIG. 2. In the exemplary embodiment, this bit-stream is divided into N fixed-length slots, each slot corresponding to a data packet. As shown in FIG. 2, a few bytes of information between successive slots (i.e. the blank regions) are maintained as an interslot gap. This gap is used to synchronize the various network adapters The format of a data slot is shown in FIG. 3. Each slot consists of a slot starting delimiter (SSD) field 310, a slot type (ST) field 308, a data field 306, an error detection field 304 containing, for example, a cyclic redundancy check (CRC) value, and a slot ending delimiter (SED) field 302.

In this embodiment of the invention, an 8B/10B transmission code is used for sending data over the fiber optic network. For a code of this type, eight-bit bytes to be sent over the network are translated into respective ten-bit values. The extra two-bits in each value are used to facilitate the recovery of a synchronizing clock signal from the data stream and to establish special control characters such as the SSD 310 and SED 302.

The particular transmission code used in this embodiment of the invention is described in a paper by A. Widmer et al. entitled "A DC-Balanced, Partitioned-Block, 8B/10B Transmission code", IBM Journal of Research and Development, Vol 27, No. 5, Sep. 1983, which is hereby incorporated by reference. This code includes twelve special characters beyond the 256 characters used to encode the eight-bit data bytes. Two of these special characters, identified as K.28.1 and K.28.5 are used as the slot starting delimiter and slot ending delimiter, respectively.

A single code data character (i.e. one of the 256) is used for the slot type field 308. In this embodiment of the invention, there may be four types of slots, each with a different character in the field 308. These four types are EMPTY, DATA, NETWORK MEMORY and NETWORK MEMORY CONTROL. A slot type of EMPTY indicates that the slot is currently unused and, thus, is available for conversion to another slot type in accordance with the protocol described below. A slot type of DATA is used for data packets sent from one transaction processor 40 to another.

A slot type of NETWORK MEMORY is used to retain global information that circulates on the network with no specified destination and can be accessed by any of the network adapters 20a through 20p. The protocol for storing, deleting, examining and modifying NETWORK MEMORY slots depends on the particular application. In the exemplary embodiment of the invention described below, a protocol is described for use with a lock management application.

A slot having a type field of NETWORK MEMORY CONTROL is similar to a NETWORK MEMORY slot in that it continues to circulate around the network until it is modified by a network adapter. However a NETWORK MEMORY CONTROL slot is distinguishable from a NETWORK MEMORY slot so that it may be used for various control functions, as set forth below.

In the lock management system described below, individual lock entities include a unique identifier, a lock mode (e.g. locked or available), and, if the lock mode is "locked" an indication of the task which currently holds the lock and a list of tasks which are waiting to procure the lock. In a typical database management system, the number of individual lock entities may be very large. In this embodiment of the invention, the various lock entities are assigned to hash classes based on their identifiers. These hash classes are treated as lock entities in that they may be "procured" by a network processor and. Status information on the hash classes is maintained on the network using the NETWORK MEMORY slots.

The hash classes may be established, for example, by applying a conventional hash function to each lock identifier. The hash function is a many-to-one mapping function which produces an address of a hash class for each lock entity. To take advantage of locality of reference for the data being protected by the various lock entities, it is desirable for lock entities that control related records in the database to map into the same hash class.

The data associated with the various lock entities that map into a given hash class is maintained in a data structure known as a lock table. In this embodiment of the invention, the lock tables representing the various hash classes are divided among the processors, each table containing the lock entries for all lock entities in a hash class. The procuring and releasing of individual locks in a hash class is managed by the processor which "owns" the hash class.

In this embodiment of the invention, the NETWORK MEMORY slots are used as global lock entities. They hold information on the state of each hash class, i.e. whether the hash class is owned by any of the transaction processors 40a through 40p and, if so, the identity of the processor. These NETWORK MEMORY slots are used to reduce the amount of time needed to procure a lock entity and, so, to access the data protected by the lock.

The rationale behind this protocol is that, with a reasonable number of hash classes (e.g. 16K to 32K), the probability is small that a particular hash class is procured when a lock request is made. Therefore, the network memory can quickly grant requests for hash class, allowing the requesting task to access the data immediately, without having to send any data messages among the processors. This shortens the time for the requesting task to procure a lock by substantially eliminating the processing delay incurred by a transaction processor in granting the lock request.

A NETWORK MEMORY slot corresponding to a procured hash class includes, in its data field 306, a first sub-field (not shown) that identifies the hash class. In this embodiment of the invention, this sub-field contains 32 bits. A second sub-field (not shown) of the data field 306 identifies the transaction processor 40a through 40p which owns the hash class. Only hash classes that are owned by a processor have corresponding entries in NETWORK MEMORY slots.

Figure 4:
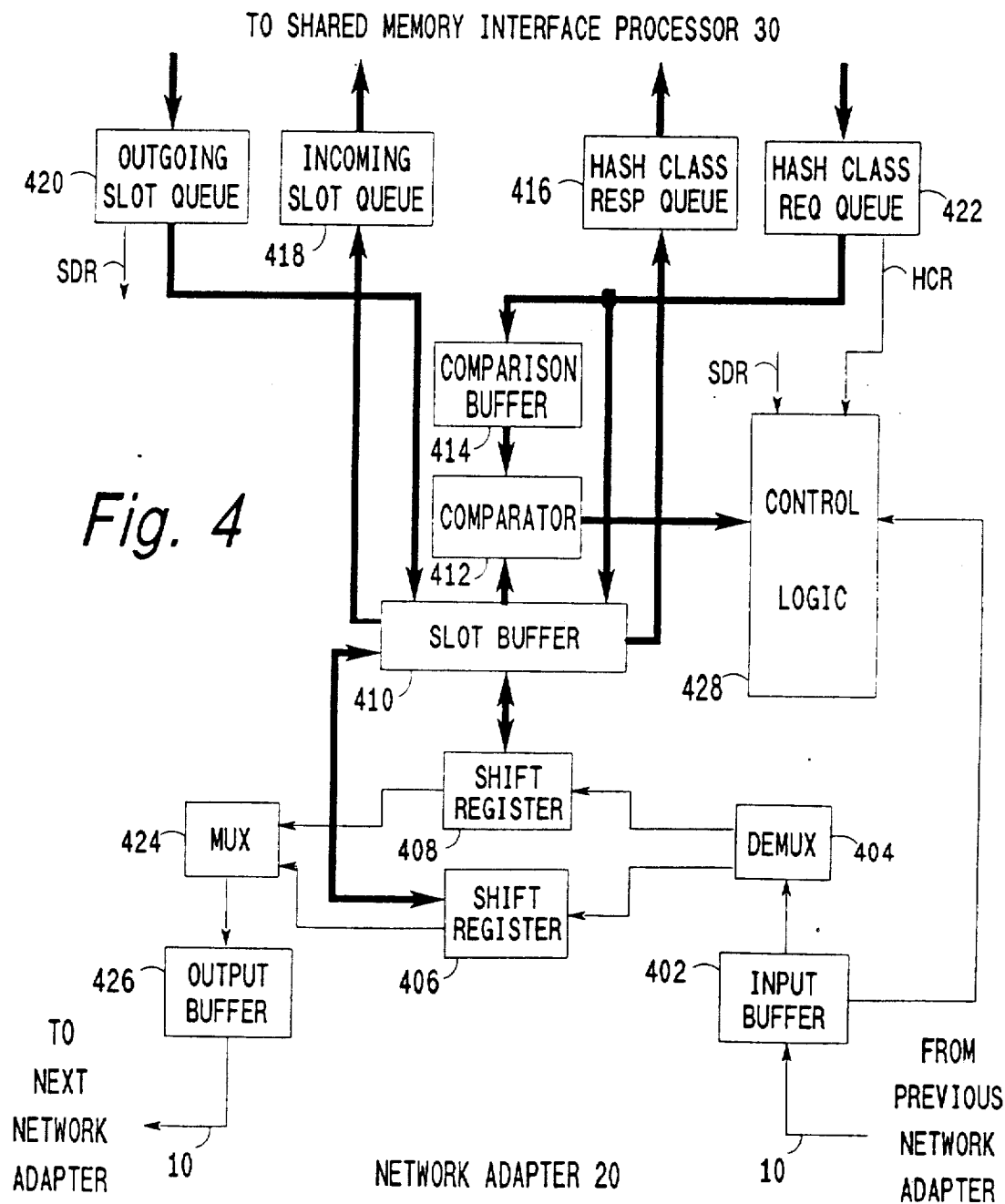
FIG. 4 is a block diagram of a network adapter suitable for use with the computer system shown in FIG. 1.

The procuring and releasing of hash classes represented by NETWORK MEMORY slots is performed by one of the network adapters 20a through 20p. FIG. 4 is a block diagram of an exemplary network adapter suitable for use with the computer system shown in FIG. 1. In FIG. 4, broad arrows represent multi-bit data paths for conveying multi-bit digital signals and the thin arrows represent paths for conveying single-bit digital signals.

The network adapter 20 shown in FIG. 4 includes an input buffer 402 which receives modulated light signals from the network 10, translates them into electrical signals and then translates the ten-bit coded-byte values represented by the electrical signals into a sequence of bit-serial eight-bit byte values. This sequence of values is applied to one of a pair of shift registers 406 and 408 via a demultiplexer 404. The demultiplexer 404 is controlled by control logic 428 to apply received slots alternately to the registers 406 and 408. When a data slot has been processed by the network adapter, as set forth below, it is shifted out of one of the registers 406 and 408 as a bit-serial data stream through a multiplexer 424. The output terminal of the multiplexer 424 is coupled to an output buffer 426 which encodes the eight-bit bytes as ten-bit values and provides these values to the network 10 as a bit-serial stream.

The shift registers 406 and 408 are controlled so that, as one slot is being shifted into a register, another slot is being shifted out. During this shift operation, the slot in the other shift register is transferred to the slot buffer 410 for processing by the network adapter. Consequently, all processing performed by the network adapter 20 is completed in the time required to shift in the packet of data held by a single slot. As soon as a packet has been shifted into one of the registers 406 or 408 it is transferred, in a single clock cycle, through the parallel output port of the shift register, to the slot buffer 410.

In an alternative implementation, variable length packets may be used instead of the fixed-length slots for providing the network memory resource This may be implemented using a standard packet transfer protocol. In this alternative implementation, the input buffer 402, demultiplexer 404, shift registers 406 and 408, multiplexer 424 and output buffer 426 would be replaced by otherwise equivalent circuitry which receives and sends variable length data packets. Circuitry of this type is known in the art and is not described in detail. In this alternative embodiment, the variable-length packets would replace the fixed length packets represented by the slots used in the present embodiment of the invention.

In addition to the two input/output ports to the shift registers 406 and 408, the slot buffer 410 has two output ports for providing data to an incoming slot queue 418 and a hash class response queue 416, respectively. The buffer 410 also has two input ports coupled to receive data from an outgoing slot queue 420 and a hash class request queue 422, respectively. In addition, the slot buffer has an output port coupled to one input port of a comparator 412.

Another input port of the comparator 412 is coupled to a comparison buffer 414 which is configured to receive data from the hash class request queue 422. The comparison buffer 414 used in this embodiment of the invention may include multiple registers which hold slot data representing, for example, an EMPTY slot, a receive DATA slot for the associated transaction processor and multiple patterns for hash class request operations described below. The control logic 428 may switch between these patterns rapidly to determine, from the output signal of the comparator 412, the type of slot held by the slot buffer 410.

An output signal of the comparator 412, that indicates a match between its two data inputs, is applied to an input terminal of the control logic 428. Control logic 428 also receives a network clock signal generated by the input buffer 402 from the received data and signals SDR and HCR, respectively, from the outgoing slot queue 420 and hash class request queue 422. These signals indicate that their respective queues are not empty.

All of the other devices in the network adapter are controlled by signals provided by the control logic 428. For the sake of clarity, these control signals are not shown in FIG. 4, however the control functions performed by the control logic 428 are described below with reference to FIGS. 4 through 8.

The network adapter 20, shown in FIG. 4, performs five basic functions: it forwards NETWORK MEMORY slots or data packets not directed to its associated transaction processor to the next leg of the network 10, it receives DATA packets from the network 10 which are directed to its associated transaction processor, it transmits DATA packets provided by its transaction processor to the network 10, it processes requests to procure a hash class lock entity and requests to release a hash class lock entity.

For the functions initiated at the network adapter 20, the requests to procure and release hash class lock entities have the highest priority followed by the requests to send DATA packets. The forwarding of slots and the receiving of DATA packets are initiated by the arrival of a packet and may be handled independently or, as outlined below, as a sub-process of the handling of the functions initiated by the network adapter 20.

Figure 5:
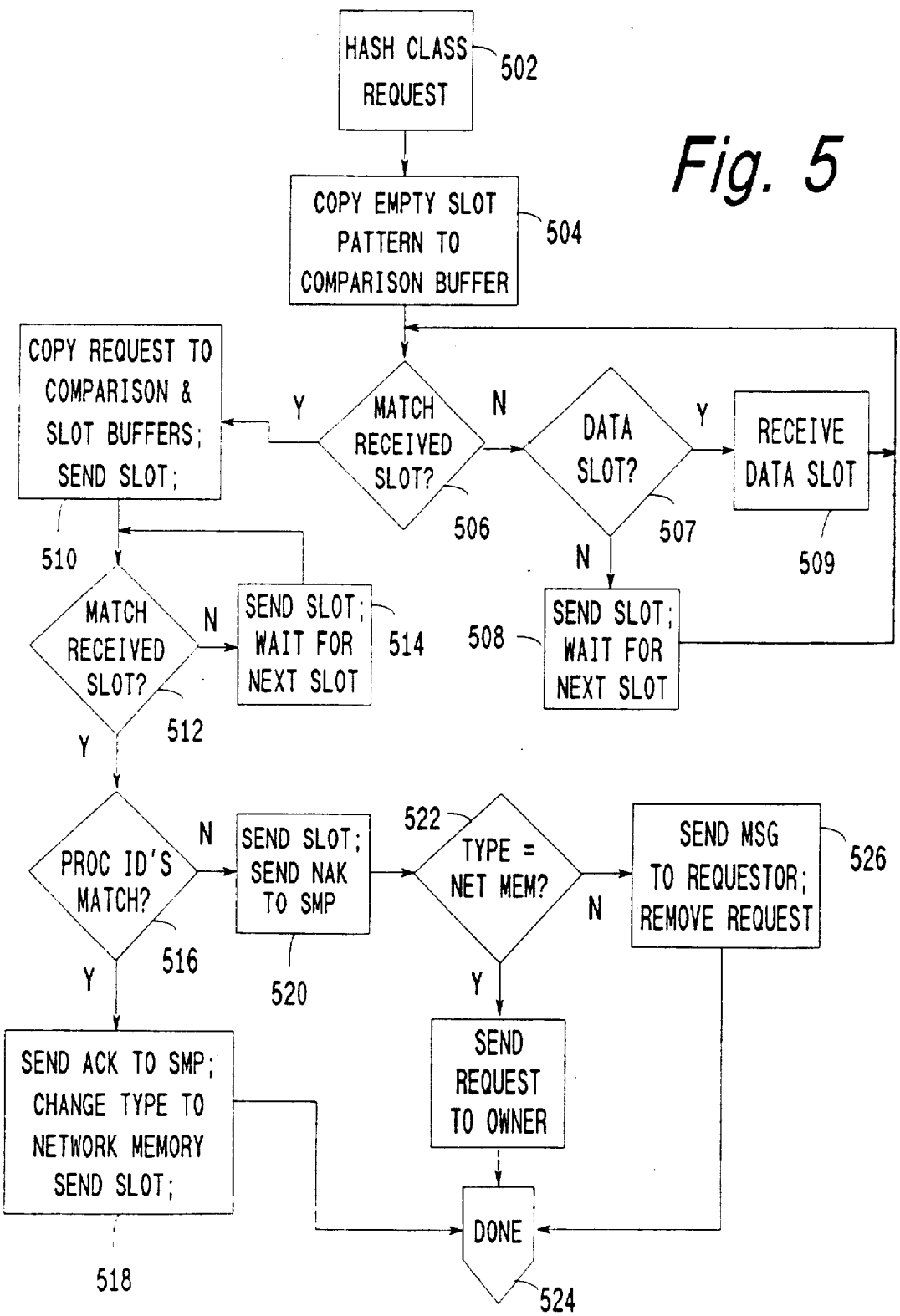
FIGS. 5-8 are flow-chart diagrams which are useful for describing the operation of the network adapter shown in FIG. 4.

FIG. 5 is a flow-chart diagram which illustrates the operation of the network adapter 20 in response to a request from the transaction processor 40 to procure a hash class lock entity. The request, actually, the signal HCR from the hash class request queue 422, is received at step 502. At step 504, the control logic 428 conditions the comparison buffer to provide an EMPTY slot pattern, that is, a slot pattern having an EMPTY slot type value to the comparator 412.

As each slot is received from the network, it is copied into the slot buffer 410 and compared to the EMPTY slot pattern provided by the comparison buffer 414. To reduce system overhead in preparing EMPTY packets, the comparator 412 may be instructed by the control logic 428 to only compare the slot type fields 308 of the slot pattern and the received slot.

If the comparator returns a signal indicating no match, the control logic 428, at step 507, conditions the comparator 412 to determine if the received packet is a DATA packet. If it is, the control logic 428 invokes the receive data packet routine at step 509. This routine is described below in reference to FIG. 8.

If, at step 507, the received packet is not a DATA packet, the control logic 428, at step 508, conditions the slot buffer 410, shift registers 406 and 408, multiplexer 424 and output buffer 426 to retransmit the slot over the network 10 to the next network adapter 20. The control logic 428 then waits for the next slot to arrive at the input buffer 402 and repeats the test at step 506.

When an empty slot is found at step 506, step 510 is executed in which the hash class request at the head of the request queue 422 is copied into the comparison buffer 414 and into the slot buffer 410. Next, the slot held by the slot buffer 410 is sent over the network as set forth above. Referring to FIG. 3, The data field 306 of this slot includes a b 32-bit hash class identification value and the processor identifier of the associated transaction processor. The type field 308 of this slot is set to NETWORK MEMORY CONTROL.

Next, at steps 512 and 514, the network adapter 20 waits for the slot to complete a circuit around the network 10. Step 512 compares the hash class identifier of each received slot to the hash class field of the request in the comparison buffer 414. Any data slots that are received during this interval are handled as set forth above in reference to steps 507 and 509.

If, at step 512, a slot is detected having the same hash class identifier as the request in the comparison buffer 414, the control logic 428 branches to step 516. At step 516, the processor identifiers of the received slot and the hash class request slot are compared. If these identifiers are the same, then step 518 is executed which sends an acknowledge (ACK) message to the shared memory interface processor 30 through the hash class response queue 416. With this ACK message, the task, running on the transaction processor 40, has procured the requested hash class and may access the record in the database that is protected by the hash class.

The step 518 also changes the type of the slot in the slot buffer 410 to NETWORK MEMORY and sends the slot through the network 10. This slot circulates on the network 10 until it is released by the transaction processor 40 which has procured the hash class. While it circulates on the network this slot is an indication that the hash class is currently procured. After step 518, the processing for the hash class request is complete, as indicated by step 524.

If, at step 516, the processor identifier of the received slot does not match that of the hash class request slot, then the received slot is retransmitted and a negative acknowledge (NAK) is sent to the associated transaction processor 40 at step 520.

If, at step 522, the slot type field, 308 of the received slot is NETWORK MEMORY, then the hash class has been procured by another processor. In this instance, the network adapter 20, at step 523 and by way of the shared memory interface processor 30, sends a message to its transaction processor 40. This message, which is sent through the hash class response queue 416, conditions the transaction processor 40 to request the lock entity from the processor which owns the hash class. This is accomplished by sending a DATA slot containing the request to the processor indicated in the slot that was received at step 512. This DATA slot is sent through the outgoing slot queue 420 as set forth below. Step 523 completes the processing of the hash class request as indicated by the branch to step 524.

If, at step 522, the slot type of the received slot was not NETWORK MEMORY, then it was NETWORK MEMORY CONTROL. This type value indicates that another transaction processor was attempting to procure the hash class at the same time as the subject processor. In this instance, the network adapter 20 deletes the hash class request from the comparison buffer and sends a message to its transaction processor 40. This message causes the transaction processor 40 to reschedule its attempt to procure the hash class after a random back-off interval. The length of the random back-off interval is determined by each requesting processor. After step 526, the processing for the hash class request is complete as indicated by the branch to step 524.

Figure 6:
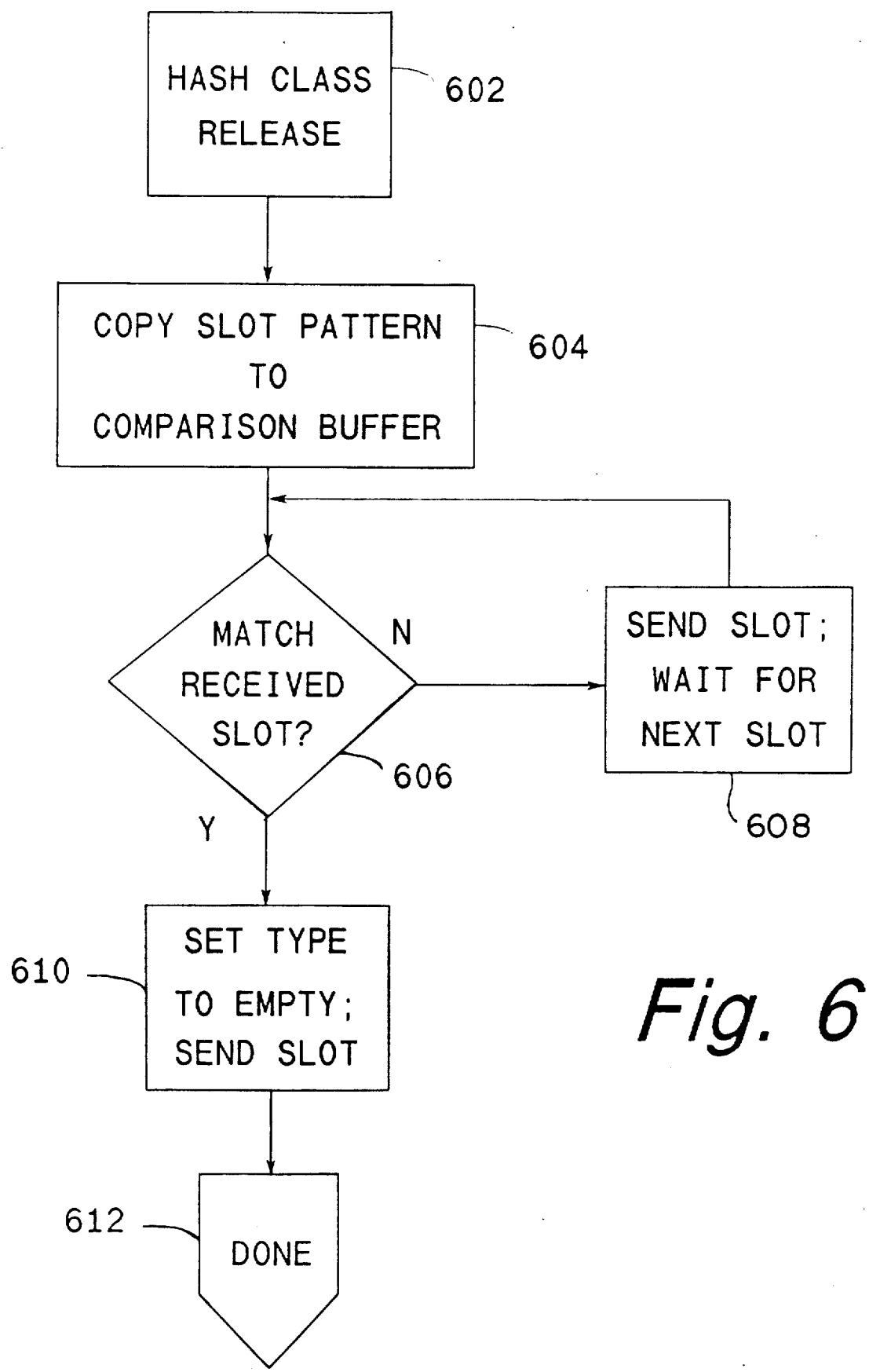

FIG. 6 is a flow-chart diagram which illustrates the handling of a hash class release request from the hash class request queue 422. After the request is received at step 602, the control logic 428 conditions the queue 422 to copy the slot pattern for the release request into the comparison buffer 414. This slot pattern has a slot type of NETWORK MEMORY, a hash class identifier and the processor identifier of the associated transaction processor 40. Next, at steps 606 and 608, each received slot is compared to the release request slot in the comparison buffer 414 until a match is found. The slot types, hash class identifiers and processor identifiers of the slots are compared at step 606. Any data slots that are received during this interval are handled as set forth above in reference to steps 507 and 509 of FIG. 5.

When a match is found at step 606, the control logic 428 conditions the slot buffer 410 to set the slot type field of the received slot to EMPTY and then conditions the shift registers 406 and 408, the multiplexer 424 and the output buffer 426 to transmit the EMPTY slot over the network 10.

Figure 7:
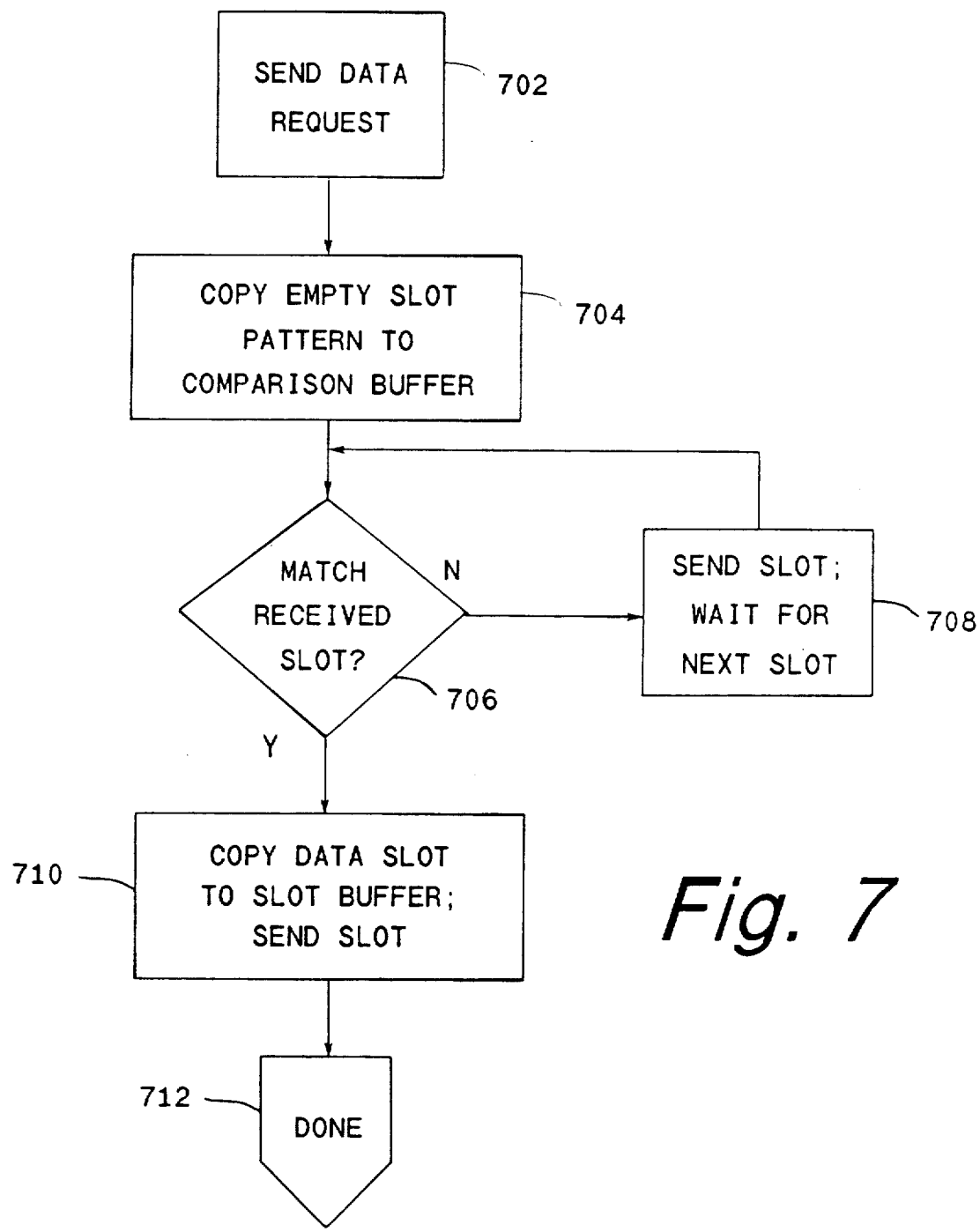

FIG. 7 is a flow-chart diagram which illustrates the processing of a send data request from the transaction processor 30. This request is sent via the shared memory interface processor 30 and is applied to the outgoing slot queue of the network adapter 20. At step 702, the request, i.e. the signal SDR, is received by the control logic from the outgoing slot queue 420. At step 704, the EMPTY slot pattern is copied into the comparison buffer 414. As set forth above, the comparison buffer may include several slot patterns and rather than copying the EMPTY pattern to the buffer, the control logic 428 may switch the buffer to provide a preset EMPTY pattern.

At steps 706 and 708, each slot received by the network adapter 20 is examined until an EMPTY slot is found. Receive data request slots which are encountered during this interval are handled as set forth above in reference to steps 507 and 509 of FIG. 5. When an EMPTY slot is received, the control logic 428, at step 710, conditions the outgoing slot queue 420 to copy the data to be transmitted into the EMPTY slot in the buffer 410. The slot buffer 410 is then conditioned to change its type field to DATA and to send the slot onto the network 10

Figure 8:
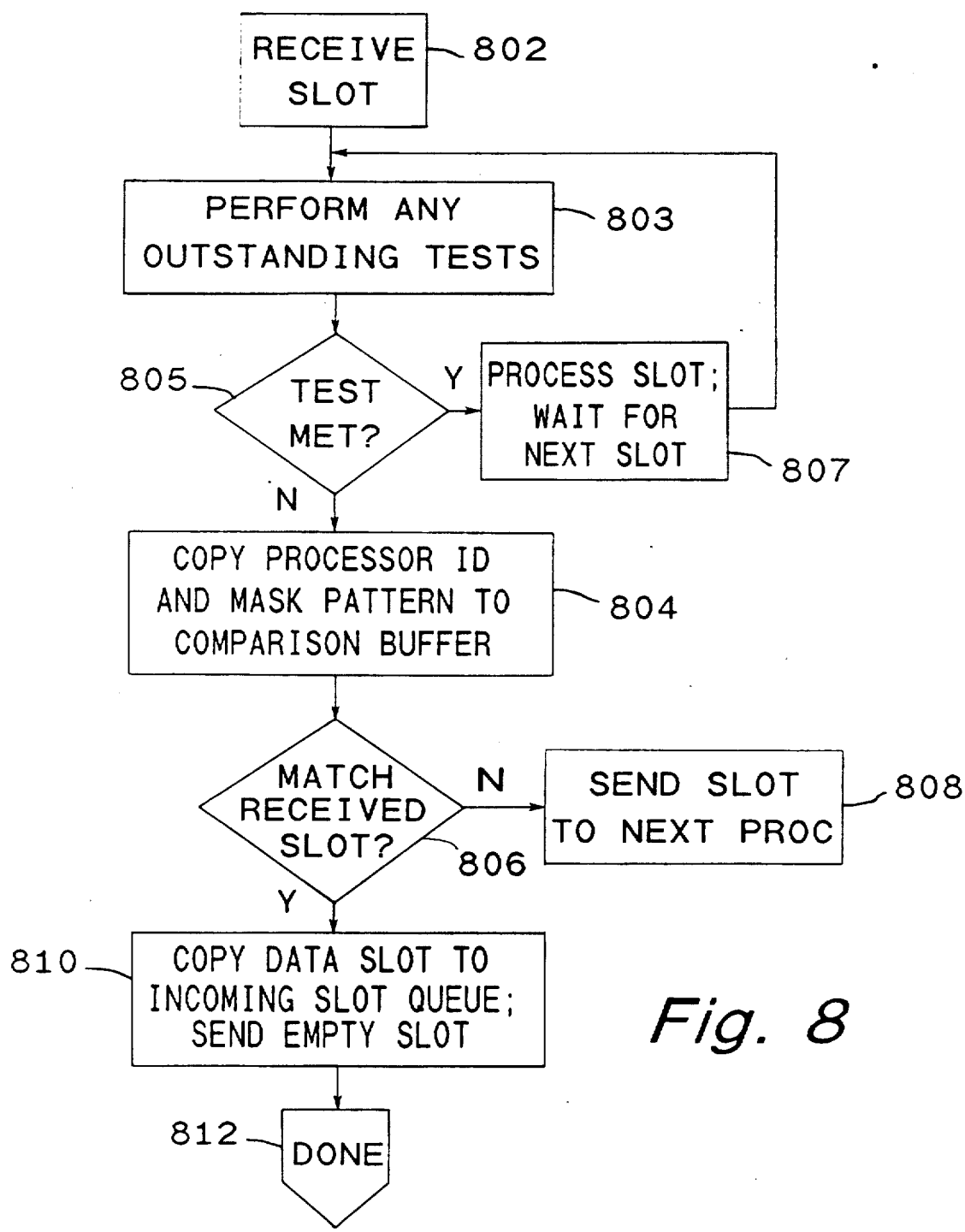

FIG. 8 illustrates the steps performed when a data slot is received at the slot buffer 410 via the input buffer 402, demultiplexer 404, shift registers 406 and 408. Whenever a new slot is loaded into the slot buffer 410, regardless of any pending requests from the outgoing slot queue 420 or hash class request queue 422, the control logic 428 conditions the comparator 412 and comparison buffer 414 to determine if the received slot is a DATA slot and if its destination processor is the transaction processor 40 associated with the receiving network adapter.

At step 802, the control logic 428 is notified by the input buffer 402 that a new slot has been received and has been copied into the slot buffer 410. In response to this signal, the control logic 428 conditions the comparator 412 and comparison buffer 410 to perform any tests relating to outstanding requests from the queues 420 or 422. If, at step 805, any of these tests are met, the control logic 428, at step 807, conditions the network adapter circuitry to process the request as indicated above in reference to FIGS. 5-7. If none of these tests are met, however, the slot is a DATA slot and execution procedes to step 804.

At step 804, the control logic 428 conditions the comparison buffer 414 to provide the processor identifier of the associated transaction processor 40 and a DATA slot type value. If, at step 806, the processor identifier of the received message does not match the identifier in the buffer 414, the slot is sent out onto the network 10 at step 808. However, if, at step 806, the processor identifiers do match, the control logic 428, at step 810, conditions the slot buffer 410 to copy the received slot data into the incoming slot queue 418. Next, the slot type field of the message in the buffer 410 is set to EMPTY and the slot is sent back onto the network 10.

Referring to FIGS. 5-7, the entry point into the program code which handles received data slots is at step 804 of FIG. 8. The steps 804, 806, 808, 810, and 812 correspond to the step 509 of FIG. 5.

While the invention has been described in terms of a global lock management system, it is contemplated that other uses may be found for the NETWORK MEMORY slots.

One contemplated use for NETWORK MEMORY slots is for task scheduling and load balancing in a transaction processing system. For task scheduling, a global task queue may be defined utilizing the NETWORK MEMORY slots. The entries in this queue may include, for example, a request for a particular transaction including an indication of any database records and programs needed to perform the transaction. The entries of this queue continuously circulate around the network. As each queue entry is received, the receiving processor compares the requested data and programs with its available resources and existing task load and either accepts or rejects the transaction. If the transaction is accepted, it is removed from the global task queue. Otherwise, it is placed back onto the network.

For load balancing, a processor which is becoming overloaded places a task request including indications of the data and programs needed to perform the task into a NETWORK MEMORY slot. When this slot is received by another processor, the facilities available to the processor (i.e. programs and database records) are compared to the requested facilities and, if a match is found and the present task load permits it, the processor schedules the task to be executed. The receiving processor sends a message to the requesting processor that it has accepted the task.

While the present invention has been described in terms of several exemplary embodiments, one skilled in the art will recognize that it may be practiced as outlined above with modifications within the spirit and scope of the appended claims.

The invention claimed is:

1. A shared memory facility for a multiprocessor computer system in which multiple processors are interconnected by a logical ring network, and a plurality of data packets are transmitted over the network, comprising:

first packet type specification means, coupled to one of said multiple processors for sending data to another one of said multiple processors by assigning a first value to a data packet of said plurality of data packets;

second packet type specification means, coupled to one of said multiple processors, for allocating a shared memory resource which circulates indefinitely on said ring network by assigning a second value to a data packet of said plurality of data packets;

means responsive to a data packet having said first value for signaling that said data packet having said first value contains the data; and means responsive to a data packet having said second value for signaling that said data packet having said second value contains the shared memory resource.

2. The shared memory facility set forth in claim 1 wherein said ring network is an optical fiber network.

3. The shared memory facility set forth in claim 1 further including lock management means coupled to each of said multiple processors for utilizing said shared memory facility as a lock management facility for controlling concurrent access to shared data by ones of said multiple processors, said lock management means comprising:

first means for identifying one of said plurality of data packets having been assigned said second value as a lock entity;

second means for notifying each of said multiple processors of a request to procure said identified lock entity;

third means for detecting a potentially conflicting use of said identified lock entity by more that one of said multiple processors; and fourth means for marking said one of said plurality of data packets as a procured lock entity after all of the multiple processors have been notified of a request to procure said identified lock entity by said second means and after no conflicting use of said identified lock entity has been detected by said second means.

4. A method of operating a computer network which includes multiple processors configured to provide a shared memory resource, said multiple processors being interconnected by a ring network, wherein communication among said processors is achieved through data packets sent in discrete data slots through said ring network, said method comprising the steps of:

(a) interpreting a portion of the data in each of said data packets as a slot type indicator having one of first and second values;

(b) processing one of said data packets having a slot type equal to said first value as a message being sent between two of said multiple processors; and (c) processing one of said data packets having a slot type equal to said second value as said shared memory resource which said shared memory resource circulates on the ring network indefinitely.

5. The method set forth in claim 4 wherein:

Step (a) includes the step of interpreting the slot type portion of said data packet as having one of first, second and third values;

and wherein said method further includes the step of:

(d) processing a data packet having a slot type equal to said third value as an empty packet including the steps of:

(d1) changing the slot type from said third value to said first value in response to a request of a first type from one of said multiple processors; and (d2) changing the slot type of said third value to said second value in response to a request of a second type from one of said multiple processors.

6. The method set forth in claim, 5 wherein said communications network is operated as a lock management system for controlling concurrent access to shared data by ones of said multiple processors, wherein:

said second slot type indicates that its corresponding data packet is a lock entity; and step (d2) occurs in response to a request by one of said multiple processors to procure said lock entity.

7. The method set forth in claim 6 further including the steps of:

(e) notifying all of said multiple processors of a request, by a requesting processor, to procure said lock entity by transmitting a slot having, in its data packet, said second slot type, an identifier of said requesting processor and an identifier of the requested lock entity;

(e) detecting conflicting use of said lock entity by one of said multiple processors by detecting received packets having a lock entity identifier identical to the transmitted lock entity identifier and a processor identifier different form the identifier of the requesting processor; and (f) changing the slot type of said transmitted slot to a fourth slot type if said transmitted slot is received by the requesting processor without detecting a potential conflicting use of the lock entity at step (e), said fourth slot type indicating a procured lock entity.

8. The method set forth in claim 7 further including the step of releasing said lock entity by receiving said data packet having a lock entity identifier indicating the lock entity to be released and having said fourth slot type identifier.

* * * * *